United States Patent [19]

Gurner

[11] Patent Number: 5,045,687

[45] Date of Patent: Sep. 3, 1991

[54] OPTICAL INSTRUMENT WITH TONE SIGNAL GENERATING MEANS

[76] Inventor: Asaf Gurner, 4, Ha'avot Street, Holon, Israel

[21] Appl. No.: 590,505

[22] Filed: Sep. 26, 1990

Related U.S. Application Data

[63] Continuation of Ser. No. 349,837, May 10, 1989, abandoned.

[30] Foreign Application Priority Data

May 11, 1988 [IL] Israel ........................ 86331
Sep. 19, 1988 [IL] Israel ........................ 87801

[51] Int. Cl.[5] ........................ G01V 9/04
[52] U.S. Cl. ........................ 250/221; 340/556
[58] Field of Search ........................ 250/221, 222.1; 340/555, 556, 557; 341/20

[56] References Cited

U.S. PATENT DOCUMENTS

| | | | |
|---|---|---|---|
| 3,597,755 | 8/1971 | Parkin | 340/555 |
| 3,852,592 | 12/1974 | Scoville et al. | 250/221 |
| 4,479,053 | 10/1984 | Johnston | 340/555 |
| 4,656,462 | 4/1987 | Araki et al. | 340/557 |
| 4,659,922 | 4/1987 | Duncan | 340/555 |
| 4,734,574 | 3/1988 | Tanaka | 250/221 |
| 4,794,248 | 12/1988 | Gray | 250/221 |

FOREIGN PATENT DOCUMENTS

| | | |
|---|---|---|
| 1209830 | 8/1986 | Canada . |
| 3436703 | 4/1986 | Fed. Rep. of Germany . |
| 7521197 | 7/1975 | France . |
| 8516765 | 11/1985 | France . |
| 8404986 | 12/1984 | PCT Int'l Appl. . |

*Primary Examiner*—David C. Nelms
*Assistant Examiner*—Stephone B. Allen
*Attorney, Agent, or Firm*—Palmatier & Sjoquist

[57] ABSTRACT

An optical instrument is provided which comprises emitter means which emit radiation into an elongated emission space and sensor means responsive to radiation directed towards them from any point of an elongated sensing space whereby to generate tone signals, the emission and sensing spaces being in only partial overlapping relationship, preferably as a result of their having different axes of symmetry, the instrument further comprising means for decoding the tone signals and transmitting the same to an interface to a device to be controlled by the instrument. Said controlled device is preferably chosen from among devices for producing musical tones and devices for producing optical images. The tone signal generating means preferably constitute a number of units, each unit corresponding to a tone and the several units being arranged in a line which preferably defines a closed floor space.

21 Claims, 9 Drawing Sheets

OPTICAL INSTRUMENT WITH TONE SIGNAL GENERATING MEANS

This is a continuation of copending application Ser. No. 07/349,837 filed on May 10, 1989, now abandoned.

This invention relates to optical instruments, and especially to musical instruments based on other kind of waves, such as ultrasonic or microwaves, viz. apparatus whereby musical tones are selectively produced by selectively acting on visible or non-visible radiation. While the invention will be described with particular reference to musical instruments, it can be applied to other devices, in particular to game playing devices, e.g. computer controlled.

Apparatus for producing sounds by radiation have been known in the art for a long time. They are based on the principle of producing radiation, modifying it, sensing the modifications and translating the same to signals, e.g. electric or electronic signals, which in turn produce musical tones. The modifications of the radiation may be produced by the motion of the operator's body in a space that is traversed by the radiation. The operator will be referred to hereinafter as "the player".

French patent 72.39367 utilizes radar radiation. The player's body reflects the radiation towards a sensor and the Doppler effect is produced, which generates signals that are translated into acoustic frequencies. The music may be generated as a function of the speed of the player's motion or of his distance from the radiation source.

French patent 81.06219 uses laser radiation, which surrounds a space in which the player moves and the tones are produced by the interception of a ray by the player's body.

U.S. Pat. No. 4,429,607 describes an apparatus comprising a number of light emitters and sensors adjacent thereto, tones being produced by reflecting back, e.g. by means of a finger, an emitted ray to the corresponding sensor.

WO 87/02168 describes, among other things, an apparatus applying the same tone-producing means as the aforesaid U.S. patent, but using retroflective elements applied to the human body to produce reflection that is stronger than random reflections, due e.g., to the ceiling. Alternatively, random reflections are neutralized by confining both the emitted and the reflected beams within a narrow tube. The application also describes a way of producing different octaves by sensing the order in which a plurality of laser rays are intercepted by the player's body.

All the prior art apparatus are somewhat primitive if considered as musical instruments. They can produce disjointed tones and a succession thereof, much as what would be produced by a beginner slowly and arhythmically depressing the keys of a keyboard actuated instrument, the several laser or light rays or groups thereof playing the part of the keys. If the player is a dancer, his motions are severely restricted by the geometrical disposition of the radiation beams used. Therefore, they can neither produce the acoustic flow that is essential to true music, nor allow the player freely to perform a dance and to produce a music that is the acoustic image of the dance performed.

It is a purpose of this invention to provide an apparatus producing a continuous flow of musical tones and therefore performing as a true musical instrument.

It is another object of the invention to produce musical tones by the selective action of a dancer's body on radiation, without the use of retroflective means. It should be understood, however, that the invention can be performed by using retroflective means, and that such a use will not, in itself, exceed the scope of the invention.

It is a further object of the invention to provide an apparatus which avoids random reflections of radiation, which may interfere with the selective and controlled production of tones, without confining the radiation with a tubular or the like confining elements.

It is a further object of the invention to provide a portable apparatus, which needs no particular fixed elements, can be disassembled or folded for easy transportation and can be used in any confined or open space.

It is a further object of the invention to provide a tone-producing apparatus which permits selectively and controlledly to produce tones by intercepting radiation with any part of the player's body and which allows the player complete freedom of motion and therefore permits him to perform a true dance, which is translated by the instrument to music.

An apparatus according to the invention comprises, in correspondence to each "tone"—by which term any sound is meant having musical significance and in general a definite pitch, which, in the customary scales, such as the chromatic scale, is physically definable in terms of basic frequency and octave—that it is desired to produce, tone signal-generating means comprising emitter and sensor means and means for producing tones responsive to signals produced or transmitted by the sensing means, and is characterized in that the emitter means emit radiations into an elongated emission space and the sensor means are sensitive to radiation directed towards them from any point of an elongated sensing space, the emission and the sensing spaces being in only partial overlapping relationship.

In a preferred form of the invention, the partial overlap of the emission and sensing spaces results from a different mean orientation (as hereinafter defined) of the said spaces. By "mean orientation" is meant the orientation of a line which represents the axis of symmetry of the (emission or sensing) space considered, when such an axis of symmetry exists; and when it does not exist, the orientation of a line that is as close to an axis of symmetry as the shape of the space will allow. For instance, a line connecting the centers of gravity of the various cross-sections of the space considered may be taken to define the mean orientation of the space. If the line is a curved one, its curve will generally be very small and it can be approximated by a straight line for the purposes of determining the mean orientation.

Preferably, the angle between the mean orientations of an emission space and the sensing space associated therewith is comprised between 2° and 10° and preferably between 2° and 5°, depending upon the radial spread, the distance between the emission source and the sensing receiver, and also on the maximum height of operation. When more than one emission space is coordinated with one sensing space, the mean orientations of adjacent emission spaces preferably make an angle comprised between 2° and 10° and preferably between 2° and 5°, depending upon the radial spread, the distance between the emission source and the sensing receiver, and the height of operation for each emission space. By "coordinated emission and sensing spaces" are meant spaces which form a part of the same tone signal-generating means, as will be explained hereinafter, viz. which cooperate to produce a tone.

In this specification and claims the term "tone", as has been noted, is not to be taken as signifying the tones of a specific musical scale, but merely to signify sounds having a definite pitch, and thus they may be the elements of a chromatic scale, including tones and semitones, or of any other musical scale or even a series of sounds having definite musical pitches and which do not respond to any known musical scale. The means for producing tones responsive to the signals generated or transmitted by the sensing means of the tone signal-generating means may be an IR transmission synchronized by a transmission synchronizer, and IR detection diode with amplifier, located within the tone signal generating unit, which detects the reflection of the IR transmission by the player, and sends indications via a data bus to tone signal generating unit decoders, within the control unit which, via the musical instrument interface, operate a tone in the musical instrument, or change a control switch within the musical instrument. These means will be further illustrated below with reference to FIG. 13.

In a modified application of the invention, the instrument is not used for producing music or in general acoustic signals, but to produce optical images. It finds thus an important application, e.g., in visual games particularly played by children by means of images appearing on a screen and controlled by the player by manipulating handles, depressing keys and the like. The invention permits to control the images by motions of the player's body, even dance-like motions, which makes the game healthier and more educational. To obtain this, it suffices approximately to design and program the control unit and to use an interface not to a musical instrument, but to a device for producing and controlling the images, in general comprising a micro-computer. Therefore in this description the words "tone signal" should be construed to include signals intended to generate not sounds or musical notes, but optical images and the like. There is of course no difference between the different applications of the invention in the tone-signal producing means, but in the decoding means, in the interface and in the device connected to the interface. It is to be noted, however, that while musical instruments wherein the sound is controlled by radiation modified by the motions of an operator's body are generally known, game-playing devices controlled by radiation modified by the motion of an operator's body are, as far as the applicant is aware, unknown in the art.

According to a preferred form of the invention, the overlapping portions of emission and sensing spaces are vertically contained between a lower level that is higher than floor level and an upper level that is lower than ceiling level. "Ceiling level" refers herein to the lowest room or space in which the apparatus is intended to be used. The upper level (maximum height of operation) may be adjusted, for instance for children who need a lower upper level than adults. In any case, the upper level is lower than the ceiling and is comprised between 1 m and 3 m, preferably between 1.5 m and 2.5 m.

The apices of the emission and sensing spaces, which are essentially the spaces in which emitter and sensor means are located, of any tone signal-generating means, are spaced from one another horizontally by a distance preferably comprised between 5 cm and 20 cm and more preferably between 10 cm and 11 cm.

In a particular embodiment of the invention the emitter means also emit and the sensor means are also sensitive to auxiliary, preferably horizontal or sub-horizontal, radiation. In another particular embodiment of the invention, the emitter means also emit weak radiation partially overlapping the sensing space of the same tone signal-generating means, but not overlapping the overlapping portion of the other emission space or spaces and of the sensing space of the same tone signal-generating means.

In a preferred embodiment of the invention, the tone signal-generating means constitute a plurality of units, each corresponding to a tone, arranged in a line defining a closed horizontal, preferably floor, space. Still more preferably, said line is a polygon. Alternatively, the said tone signal-generating means may be arranged on an open line, so that at least some angular directions exist in which movement of the player will not activate the signal. In a preferred form of the invention, the emission and sensing spaces are peripherally close together, covering a prevalent part of the periphery of the aforesaid closed line or polygon. Still more preferably, the peripheral gaps between emission and sensing spaces of adjacent tone signal-generating units do not exceed 10 cm and preferably 5 cm at any level, the widest gaps usually existing at the lowest level at which the emitter and sensor means are located, or are the same along the entire height.

Preferably the radiation employed in the apparatus according to the invention is infrared (IR) radiation.

When the tone signal-generating units are arranged in a closed line defining a closed floor space, the emission and sensing spaces have a very small peripheral spread (as hereinafter defined) and a significant radial spread (as hereinafter defined). If an (emission or sensing) space is intercepted with a plane having the same orientation as the mean orientation of the space and passing through the emitter or sensor means respectively, the two aligned lines bounding the said intersection will form an angle which defines what is called here the "lateral spread". In like manner, the lines bounding the intersection of a (emission or sensing) space with a vertical plane passing through the center of the space encompassed by the aforesaid closed line or polygon along which the tone signal-generating units are arranged, will make an angle which defines what is called herein "the radial spread". Preferably, the lateral spread is comprised between 0° and 10° and still more preferably does not exceed 10°, while the radial spread is preferably comprised between 1° and 5° and still more preferably between 2° and 4°.

In a preferred form of the invention, the sensor means comprise a radiation sensor, e.g. a photoelectric cell, and means for concentrating thereon radiation originating from the corresponding sensing space, while excluding radiation not originating from it. In a preferred embodiment, said concentrating means comprise at least two mirrors, one of which is preferably parabolic. In another preferred embodiment, said concentrating means comprise at least one lense, preferably a cylindrical one.

In a preferred form of the invention, the apparatus comprises means for alternately activating the several tone signal-generating units.

In a preferred embodiment of the invention, the several tone signal-generating units are supported each on a segment of a supporting structure defining a closed line. Preferably, said supporting structure is assemblable and disassemblable and/or foldable, the segments being pivotally connected the one to the other.

Preferably, emitter diodes emitting radiation synchronized by a transmission synchronizer, sensing diodes adapted to sense the radiation and means for analyzing the reception due to its synchronized nature are employed.

The tone signal-genrating units can be so designed that the signal they produce at any given time depends only on the specific radiation beam which is intercepted, or they may be so designed as to be responsive to the succession in which two different beams are intercepted, and even to the time difference between the interception of two different beams. Thus, e.g., said time difference may be utilized to control the intensity of the tone produced.

The activation of one tone signal preferably does not inactivate other tone signal-generating means, so that more than one tone may be played concurrently. The various tone signal-generating units are preferably activated in sequence, one at a time, the frequency of the activation being so high that said activation is felt by players and listeners as continuous.

Many other features, variants, and possible additions as well as advantages of the invention will become apparent to a skilled person as the description proceeds.

A number of preferred embodiments will now be described, with reference to the attached drawings, wherein.

Figure 12:
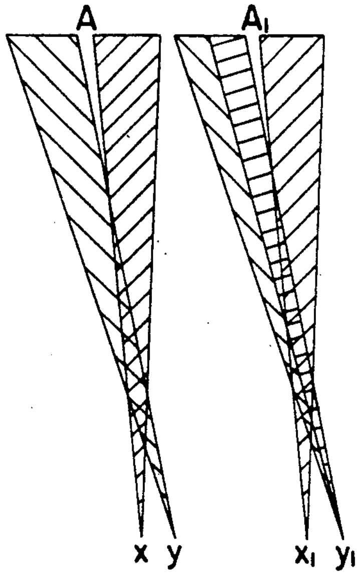
Figure 13:
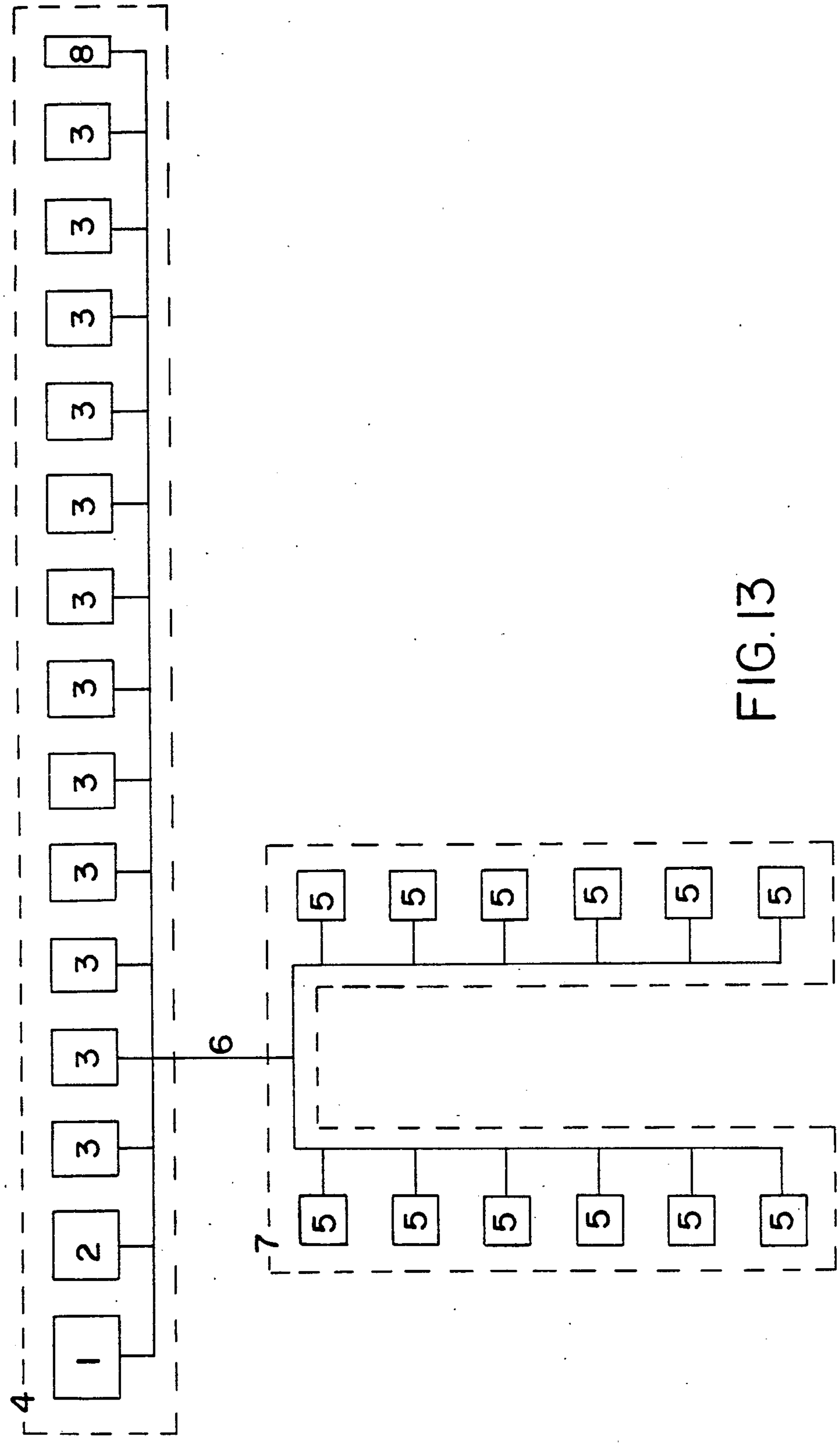

FIG. 12 schematically indicates means for controlling the intensity of the tones produced;

FIG. 13 is an electronic diagram of a device according to an embodiment of the invention.

Figure 1:
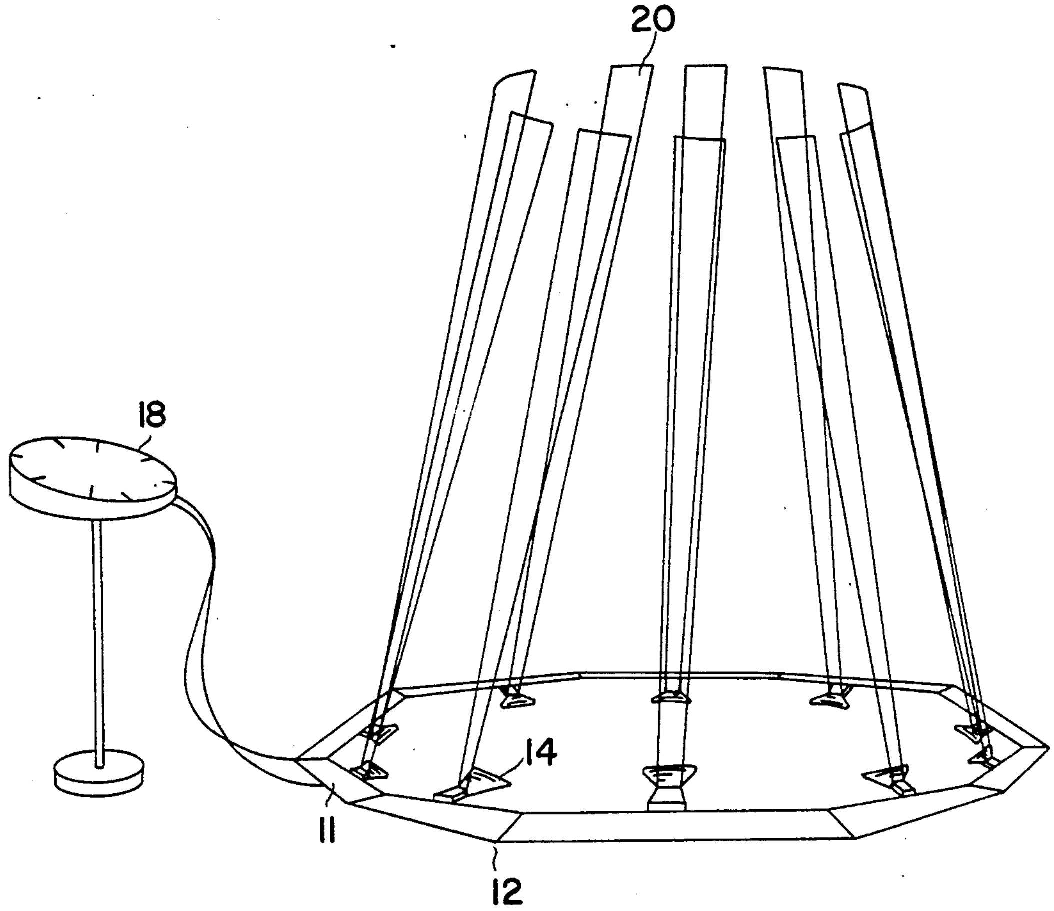
FIG. 1 is a perspective view of an embodiment of an apparatus according to the invention.
Figure 2:
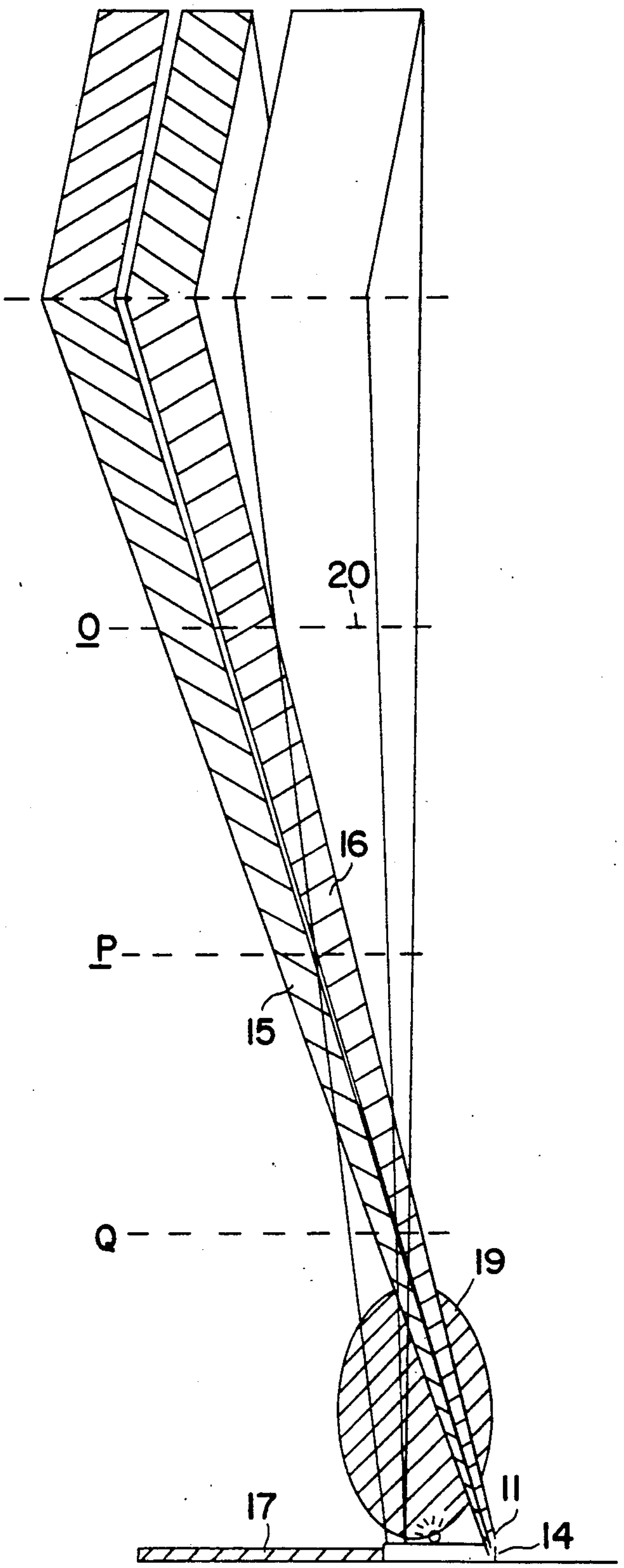
FIG. 2 is a perspective view of the emission and sensing spaces of a tone signal-generating unit according to an embodiment of the invention.
Figure 3:
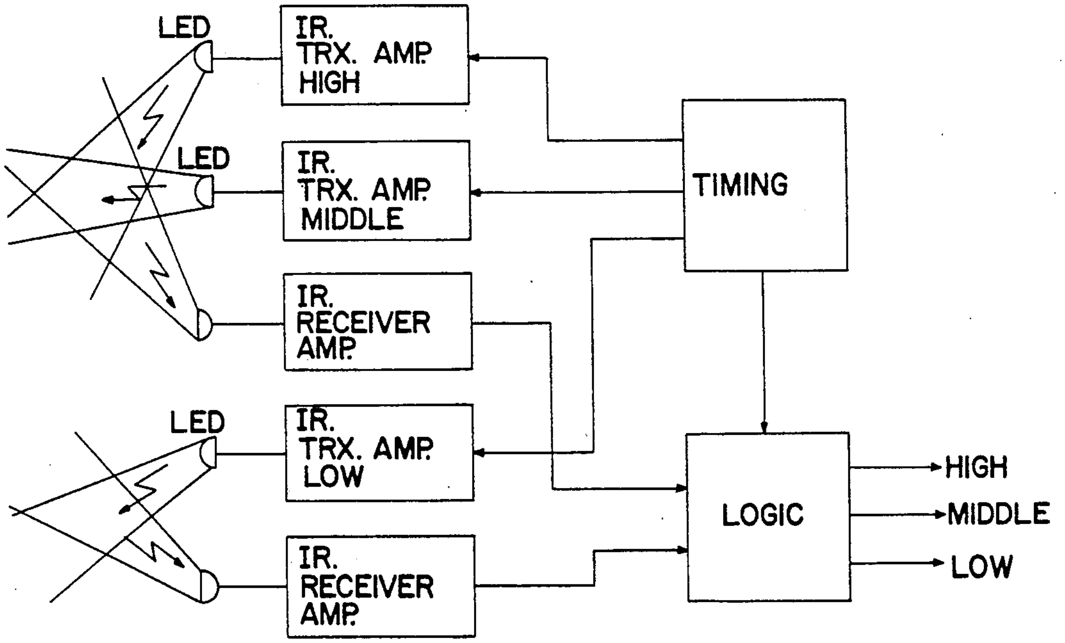
FIG. 3 is a block diagram schematically illustrating the electronic circuits of the apparatus.

Referring now to FIGS. 1-3, the apparatus according to the invention comprises a plurality of tone signal-generating units generally indicated at 14—hereinafter briefly called "tone units"—which are attached each to a supporting member 11, a succession of such supporting members being arranged in a closed line, in this particular embodiment a polygon having 12 sides, generally indicated at 12. A numeral 18 generally indicates an electronic control unit which elaborates the signals received by the tone units.

Each tone unit, in this embodiment, comprises two emitters which produce radiation extending over two emission spaces, hereinafter briefly called "beams", preferably IR radiations, indicated in FIG. 2 at 15 and 16. The emitters themselves are not illustrated, as they may be of any conventional construction, but they are located at lowermost tip of the beams 15-16. Emitter means for producing horizontal radiation, schematically indicated at 17, may also be provided. Further, other emitter means may be provided for producing a radiation, schematically indicated at 19, of low intensity. The sensor means, which form a part of the tone unit, are so arranged as to be sensitive to radiation which originates or is reflected so as to be seen as originating from a sensing space 20, hereinafter briefly designated as "passive beam".

For producing radiation, and in this particular embodiment of the invention, LEDs in the IR range are preferably provided and are connected to IR transmitter-amplifier means. The corresponding sensor means, viz. the IR receiver, is connected to IR receiver-amplifier means.

Not considering for the time being the horizontal radiation 17, it is obvious that if a person intercepts with any part of his body or an object intercepts any part of the emitted radiation outside the passive beam, viz. the sensing space, this will activate no element of the tone unit and no tone signal would be produced. If, however, the player intercepts with a part of his body any part of the radiation within the said passive beam or sensing space, that radiation will be reflected back to the sensor and will activate it to produce a tone signal. Actually, the word "reflect" is not appropriate, since strictly speaking a part of the player's body will diffuse any incident ray producing a scattered diffused radiation; however, for the purposes of this description, the words "reflect" and "reflection" will be used to include diffusion phenomena. In other words, a tone signal will be produced whenever the player intercepts any part of the radiation in the space in which the emitter beams overlap the passive beam, viz. one of the emitting spaces overlaps the sensing space. In the arrangement shown in the drawing, only the beam 16 will be intercepted within the overlapped space between the levels) and P. Between the levels P and Q, both beams will be intercepted, however the beam 15 will be intercepted first. as it is located on the side closer to the center of the area circumscribed by the apparatus, viz. closer to the player, as indicated by the slant of the beams, which is towards the center, as seen in FIG. 1. Below level Q and above floor level, beam 19 only will be intercepted. The control circuits of the apparatus are so designed, in this embodiment of the invention, that once one beam has been intercepted, subsequent interception of another beam will not cause any further activation of the tone unit, so that only one beam at a time is active. A skilled person will have no difficulty in so designing them. Therefore different active beams will be intercepted at different heights, and the player will know how to move in order to intercept the desired beam. Each tone unit is adapted to produce a tone signal associated with one tone or semitone or in general one element of the scale adopted, and therefore all the tone signals produced by the same tone unit will have the same basic note in the octave, but to each radiation beam or emission space will correspond a different octave. Therefore, the apparatus will be able to generate tones in one, two or three octaves, according to whether only one or two or all three of the radiation beams 15, 16 and 19 are present. On the other hand, any reflection from the ceiling will not result in the production of a tone signal or even of "noise", since it will lie outside the sensing space, as long as the angle between the sensing space and the emission space is adequate and no overlap of the several spaces can occur above the height at which the player operates.

The horizontal beam, on the other hand, will cause the production of a tone signal every time it is intercepted (at floor level), since in its case emission and sensing space substantially overlap. In order to prevent the production of undesired tone signals or of "noise" because of the reflection of the horizontal beams from the various parts of the polygon 12, the tone units will be sequentially activated one at a time. Since each activation will only last for a very brief period of time, e.g. in the order of the millisecond, this will not interfere with the player's operating the apparatus. The addition of the horizontal beam will provide an additional octave and thus the apparatus will be able to produce four different octaves, or three if the low intensity beam 19 is omitted.

FIG. 3 shows a schematic diagram in which three radiations are produced, by means of three LEDs, while two receivers are provided, one of them being sensitive to radiation from within space 20, while the other one is sensitive to horizontal radiation.

Figure 4:
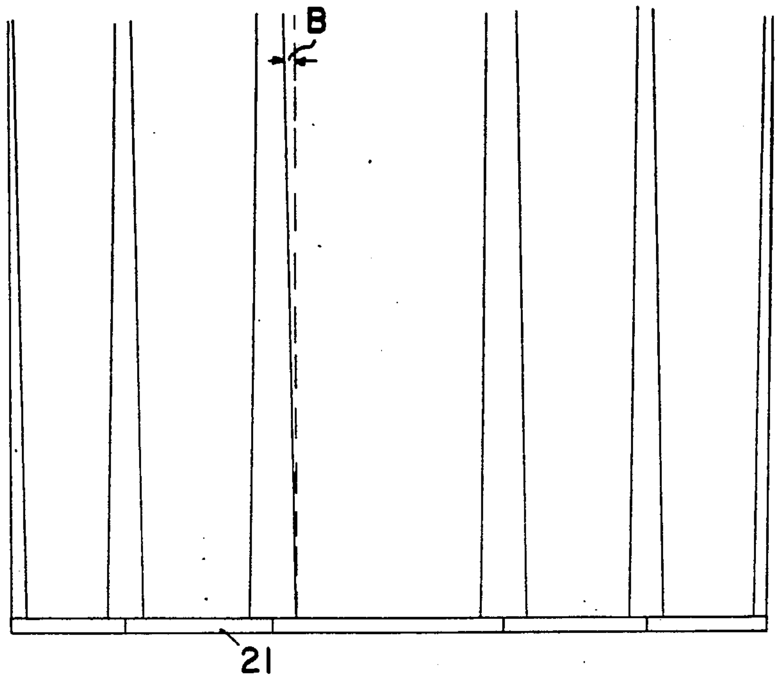
FIG. 4 is a vertical side view of a device according to an embodiment of this invention, showing the sensing spaces.
Figure 6:
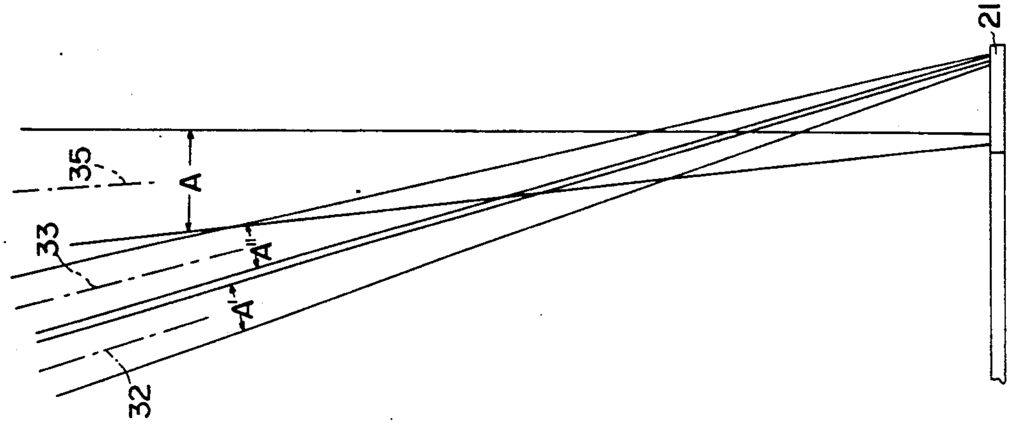
FIG. 6 is a radial cross-section of the device of FIG. 4, taken along the plane VI—VI of FIG. 5.
Figure 5:
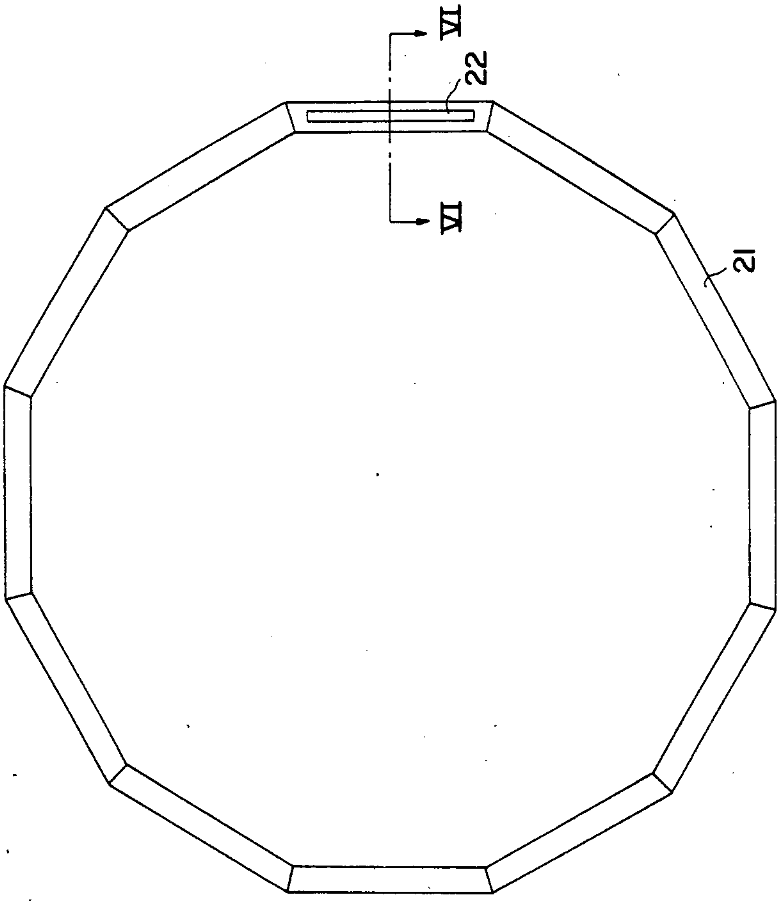
FIG. 5 is a plan view of the device of FIG. 4 not showing the emission and sensing spaces.

With reference now to FIGS. 4–6, an improved apparatus, according to the present invention, comprises once again a number of supporting elements 21, which preferably constitute the sides of a polygon, still more preferably of a 12 sided polygon, as is desirable when the chromatic scale is used. Each supporting element contains a tone signal-generating unit 22, but in this case each unit has an elongated configuration and a length which approximates that of the supporting elements. The emission spaces and the sensing space of each tone unit substantially have the shape of a truncated pyramid having a rectangular base. In the embodiment described, the active portions of the emitters and sensors, which determine the dimensions of the apices of the truncated pyramids constituting the emission and sensing spaces, have a length of approximately 10 cm to 30 cm and a width of approximately 1 cm to 2 cm. The supporting elements, on the other hand, have a length of 30 cm to 45 cm, so that the apices of the emission and sensing spaces of adjacent tone units are horizontally spaced, at floor level, by a length of about 40 cm to 50 cm.

As seen in FIG. 6, the low intensity radiation, in this particular embodiment, is omitted. The mean orientations of the two upwardly-directed (non-horizontal) emission spaces 30 and 31 are indicated at 32 and 33 respectively, and the mean orientation of the sensing space 34 is indicated at 35. It is seen that the two mean orientations 32 and 33 make angles of approximately 5° and 10° with the mean orientation 35, which angles are comprised within the angle ranges hereinbefore specified. The radial spreads are indicated at A, A' and A" in FIG. 6 and the lateral spread, assumed to be the same for all beams, in this embodiment, though it need not be, is indicated at B in FIG. 4.

Figure 7:
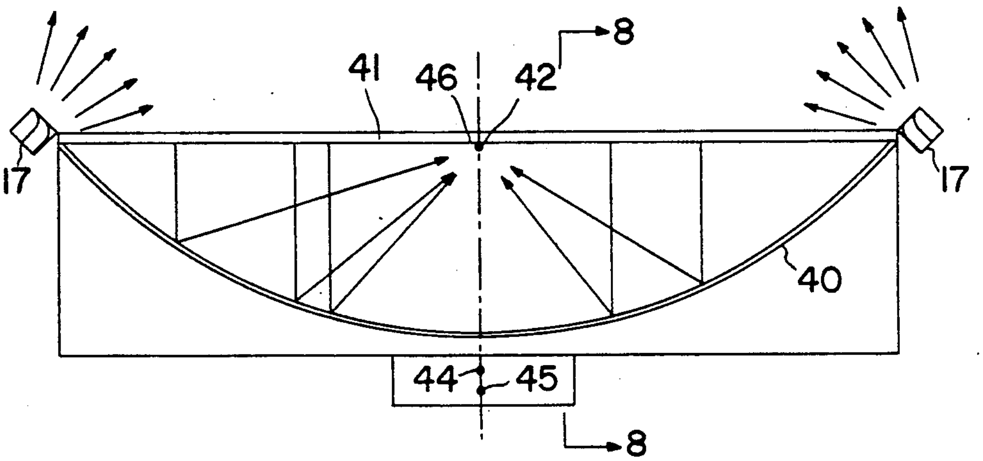
FIG. 7 is a schematic plan view of a tone signal-generating unit, comprising emitter and sensor means.
Figure 8:
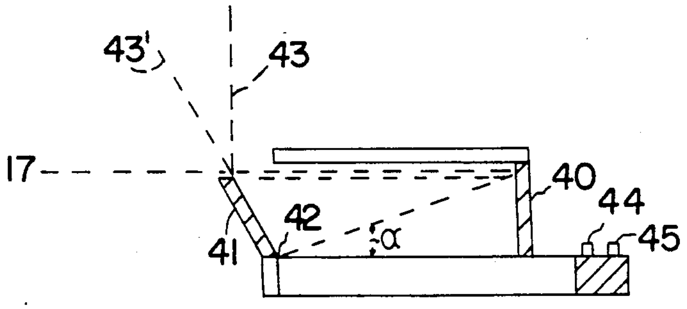
FIG. 8 is a cross-section of the unit of FIG. 7, taken along the plane 8—8 of said FIG. 7.
Figure 9:
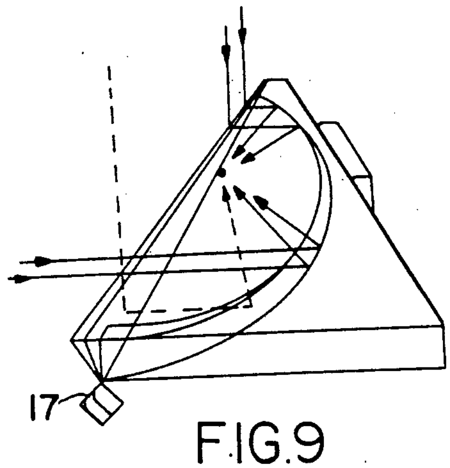
FIG. 9 is a perspective view of the unit of FIGS. 7 and 8.

FIGS. 7–9 illustrate an emitter-sensor device according to one embodiment of the invention, which device is constructed by using mirrors. A substantially vertical parabolic mirror 40 cooperates with the straight mirror 41 which is inclined at 45° to the vertical. A diode 42, sensitive to the radiation used, in particular to IR radiation, is located at the focus of the parabolic mirror. A ray generated in or originating from a point of the sensing space is indicated at 43–43'. Such a ray will strike mirror 41 and be reflected at right angles to its original direction. If it strikes the parabolic mirror 40, it will then be reflected to the diode and will be sensed by the diode, thus producing a tone signal. However, the rays that strike both mirrors are those confined within a narrow beam.

With reference to FIG. 8, one sees that ray 43, vertically directed and striking mirror 41, will be reflected in a horizontal direction and will strike mirror 40, if it is not higher than the upper edge thereof, and will then be reflected to diode 42. Likewise, ray 43' will strike the bottom of mirror 40 and be reflected to diode 42. All rays within the beam between ray 43 and ray 43' will therefore strike mirror 40 and activate diode 42, while all rays falling outside that beam will not do so and will either miss the sensing device entirely or will strike the floor thereof and be scattered or absorbed thereby. However, such beams of incident rays will not be the same at every cross-section of the sensor, since the distance between the two mirrors and therefore the angle indicated by alpha will be different in the several cross-sections. As a result, the sensing space will not have the exact shape of a truncated pyramid, but have cross-sections that are not rectangular. Still, this does not create any difficulty and can be empirically taken into consideration, when designing the device.

The emission spaces determined by the emitters schematically indicated at 44 and 45 in FIG. 7 will on the contrary be substantially square-based pyramids.

When horizontal radiation 17 is present, it can be reflected back and strike diode 42 through an opening 46 indicated in the drawings.

In an alternative embodiment, instead of the parabolic mirror 40 and mirror 41, a solid, transparent, prismatic body may be provided bounded by a curved surface corresponding to mirror 40 and by a plane surface corresponding to mirror 41, and having its curved surface coated with a reflecting coating whereby to produce a mirror effect. Any transparent material, such as plastic material, e.g. polymethylmethacylate, or any other material having a suitable refraction index, may be used. Prisms or lenses may also be used, provided that they are suitably designed to produce the required radiation concentration, their design within the skill of the person skilled in the optical art.

Figure 10:
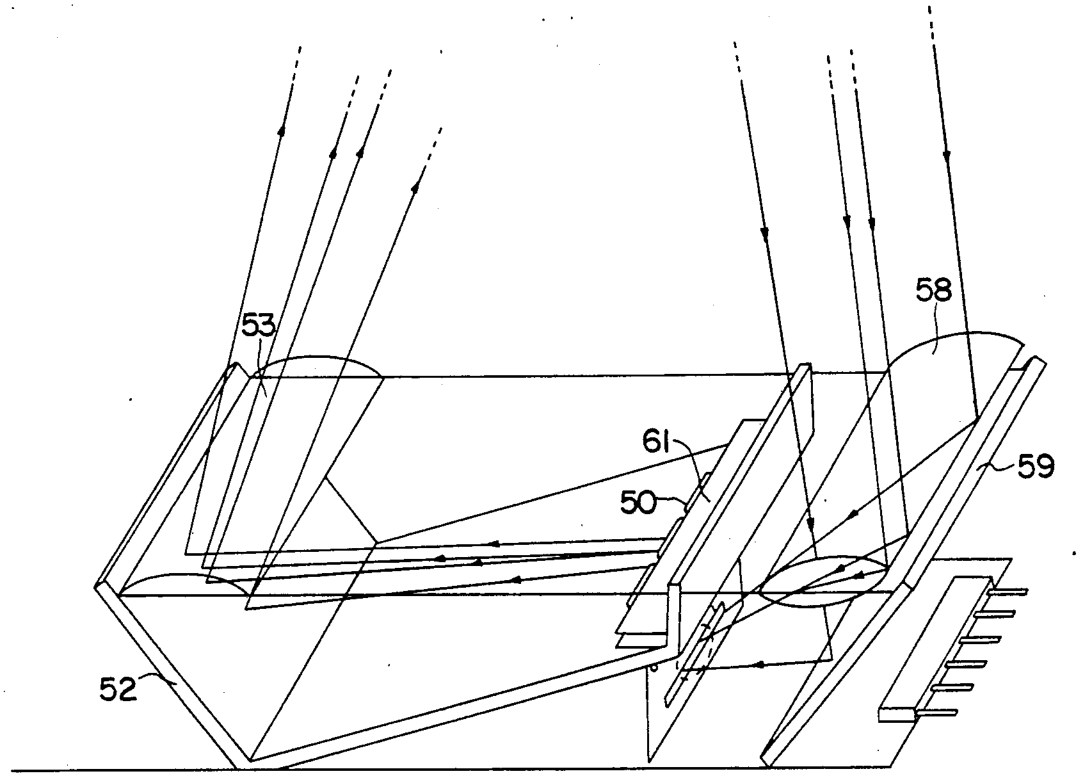
FIGS. 10 and 11 illustrate in perspective views from opposite sides another embodiment of a tone signal-generating unit.
Figure 11:
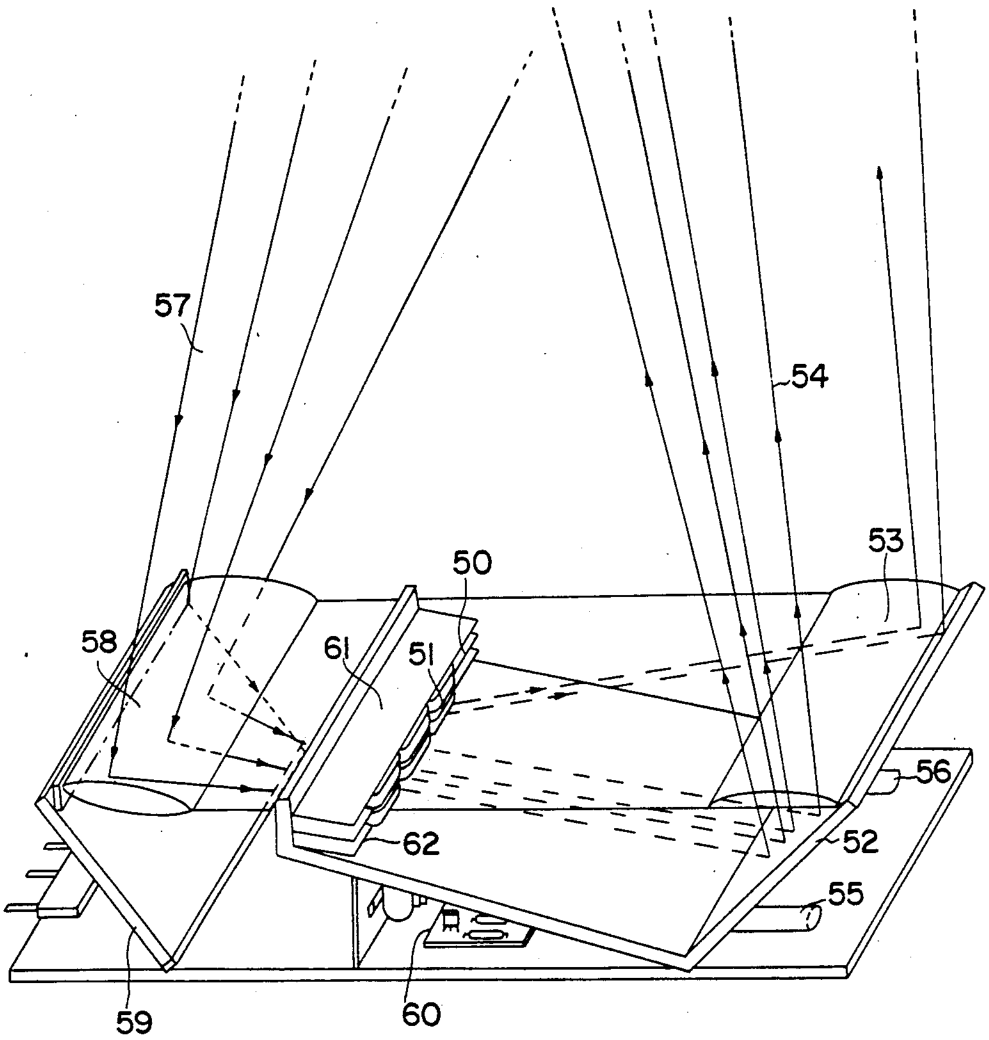

FIGS. 10 and 11 illustrate another type of tone unit. In this embodiment radiation beams 15 and 16 are produced by radiation emitters, e.g. IR LEDs 50 and 51. These emit in horizontal direction and the emitted beams strike a slanted mirror 52, e.g. set at 45° angle, which reflects them to cylindrical lens 53 producing upward-directed rays as schematically indicated at 54. Horizontal radiation is produced by emitter 55 and reflected back to receiver 56. Radiation reflected from the space in which the emitted and passive beams overlap, and schematically indicated at 57, will strike a bicylindrical lens 58 and be concentrated by it on a mirror 59 slanted e.g. at 45°, by which they will be reflected to the sensor device, e.g. an IR receiver-amplifier. 60, 61 and 62 indicate two light buffers which protect the radiation emitters.

FIG. 12 shows the detection beam 63 and the transmission beam 64, penetration being effected in the direction of the arrow. Lines AX and $A_1X_1$ are parallel. The fronts of the sensing fields of the two beam-complexes have the same distance from one another at all heights, and therefore the speed of penetration can be calculated to analyze the intensity (volume) of the note produced.

FIG. 13 is a block diagram which is self-explicative, and which comprises the following elements:

1. Transmission synchronizer
2. Power supply
3. Tone signal generating unit decoder
4. Control unit
5. Tone signal generating unit
6. Data bus
7. Supporting element
8. Interface to musical instrument or to optical image producing device, computer, or the like.

As will be apparent from the above description, the musical instrument of the invention provides a considerable improvement over devices of the known art, allowing for a fluent and varied performance on the player's part, while leaving considerable freedom of movement to the player.

The above description has been provided for the purpose of illustrating the invention, and must not be construed as a limitation, as many variations and modifications of the apparatus are possible without exceeding the scope of the invention.

I claim:

1. Optical instrument, comprising tone signal-generating means comprising emitter and sensor means and means for producing tone signals responsive to signals produced or transmitted by the sensor means, characterized in that the emitter means emit radiations into an elongated emission space and the sensor means are sensitive to radiation directed towards them from any point of an elongated sensing space, the emission and the sensing spaces being in only partial overlapping relationship, the optical instrument further comprising means for decoding the tone signals and transmitting the same to an interface to a device to be controlled by the instrument.

2. Instrument according to claim 1, wherein the emission and sensing spaces include axes of general symmetry, and the partial overlap of the emission and sensing spaces resulting from the emission and sensing spaces having different axes of general symmetry.

3. Instrument according to claim 1, wherein the emission and sensing spaces include axes of general symmetry, and the angle between the axis of general symmetry of at least one of the emission spaces and the axis of general symmetry of at least one of its respective sensing spaces being approximately between 2° and 10°.

4. Instrument according to claim 1, wherein the overlapping portions of emission and sensing spaces are vertically contained between a lower level that is higher than a floor level and an upper level that is lower than a ceiling level.

5. Instrument according to claim 1, wherein each of the emission and sensing spaces includes an apex and the apices of the emission and sensing spaces of any one tone signal-generating means are spaced from one another horizontally by a distance of approximately between 5 cm and 20 cm.

6. Instrument according to claim 1, wherein the emitter means also emit and the sensor means are also sensitive to auxiliary horizontal or sub-horizontal radiation.

7. Instrument according to claim 1, wherein the emitter means also emit weak radiation partially overlapping the sensing space of the same tone signal-generating means and being spaced from the overlapping portion of any of the other emission spaces and of the sensing space of the same tone signal-generating means.

8. Instrument according to claim 1, wherein the several tone signal-generating units are supported each on a segment of a supporting structure defining a closed line.

9. Instrument according to claim 1, wherein the signal produced at any given time by the tone signal-generating units is related to the specific radiation beam which is intercepted.

10. Instrument according to claim 1, wherein the intensity of the signal produced by the tone signal-generating units is related to the succession in which two different beams are intercepted.

11. Instrument according to claim 1, wherein the tone signal-generating means remains activatable during the activation of one or more tone signals whereby more than one tone may be played concurrently, and wherein the various tone signal-generating units are activatable in sequence whereby the frequency of the activation is so high that said activation which is felt by players and listeners is continuous.

12. Instrument according to claim 1, wherein the overlapping portions of emission and sensing spaces are vertically contained between a lower level and an upper level, the distance between the levels being approximately between 1.5 m and 2.5 m.

13. Instrument according to claim 1, wherein the tone signal-generating means constitute a plurality of units, each of the units corresponding to a tone and being arranged in a line defining a closed floor space.

14. Instrument according to claim 13, wherein the line comprises a periphery, and each of the units is spaced from each other, the spaces between adjacent units on the line defining a plurality of peripheral gaps, the peripheral gaps between emission and sensing spaces of adjacent tone signal-generating units being within approximately 10 cm at any level.

15. Instrument according to claim 13, wherein the lateral spread of the emission spaces is between approximately 0° and 10° and the radial spread of the emission spaces is between approximately 1° and 5°.

16. Instrument according to claim 13, wherein the line comprises a periphery, and each of the units is spaced from each other, the spaces between adjacent units on the line defining a plurality of peripheral gaps, the peripheral gaps between emission and sensing spaces of adjacent tone signal-generating units being within approximately 5 cm at any level.

17. Instrument according to claim 1, wherein the sensor means comprises a radiation sensor and means for concentrating on the radiation sensor radiation originating from the corresponding sensing space.

18. Instrument according to claim 17, wherein the concentrating means comprises a parabolic mirror.

19. Instrument according to claim 17, wherein the concentrating means comprises a lens.

20. Instrument according to claim 17, wherein the concentrating means comprises a prism.

21. Optical instrument, comprising tone signal-generating means comprising emitter and sensor means and means for producing tone signals responsive to signals produced or transmitted by the sensor means, characterized in that the emitter means emit radiations into an elongated emission space and the sensor means are sensitive to radiation directed towards them from any point of an elongated sensing space, the emission and the sensing spaces being in only partial overlapping relationship, and wherein the device to be controlled is chosen among devices for producing musical tones, whereby to generate a musical instrument, and devices for producing controlled, preferably computer-controlled, optical images, whereby to generate a game-playing instrument.

* * * * *